June 27, 1967 V. H. MEYER 3,327,786
HERBICIDE INCORPORATOR
Filed March 9, 1966 2 Sheets-Sheet 2

INVENTOR.
VERNIS H. MEYER
BY
ATTORNEY

United States Patent Office 3,327,786
Patented June 27, 1967

3,327,786
HERBICIDE INCORPORATOR
Vernis Henry Meyer, Granger, Iowa, assignor to Deere &
Company, Moline, Ill., a corporation of Delaware
Filed Mar. 9, 1966, Ser. No. 532,921
2 Claims. (Cl. 172—151)

ABSTRACT OF THE DISCLOSURE

A herbicide incorporator having front and rear gauge wheels that support a horizontal longitudinally extending beam which in turn carries between the gauge wheels a cultivator sweep and a pair of disk hillers which mix herbicide material into the soil.

The present invention relates generally to agricultural implements and more particularly to devices for incorporating chemicals, such as herbicides, into the soil.

In the past few years various herbicides have been developed for preventing the growth of noxious weeds. Up until a few years ago these chemicals were simply placed in a band on the surface of the soil, but it has been found that some of these herbicides will do a better job if they are incorporated into the soil. Furthermore, the depth to which they should be incorporated varies with the particular herbicide being applied. Thus, some herbicides work best when incorporated one-quarter to one-half inch deep in the soil, others up to two inches, and still others as deep as four inches. While various incorporating devices have been proposed, none have been entirely successful, particularly when incorporating up to four inches deep.

Therefore it is an object of this invention to provide an incorporator which will successfully incorporate herbicide material into the soil up to depths of four inches.

A further object of this invention is to provide an incorporating structure which is low in cost, easy to maintain, and of high durability.

These and other objects and advantages of this invention will be apparent to those skilled in the art after a consideration of the following detailed description, taken in conjunction with the accompanying drawings in which the preferred form of this invention is illustrated.

Figure 1:
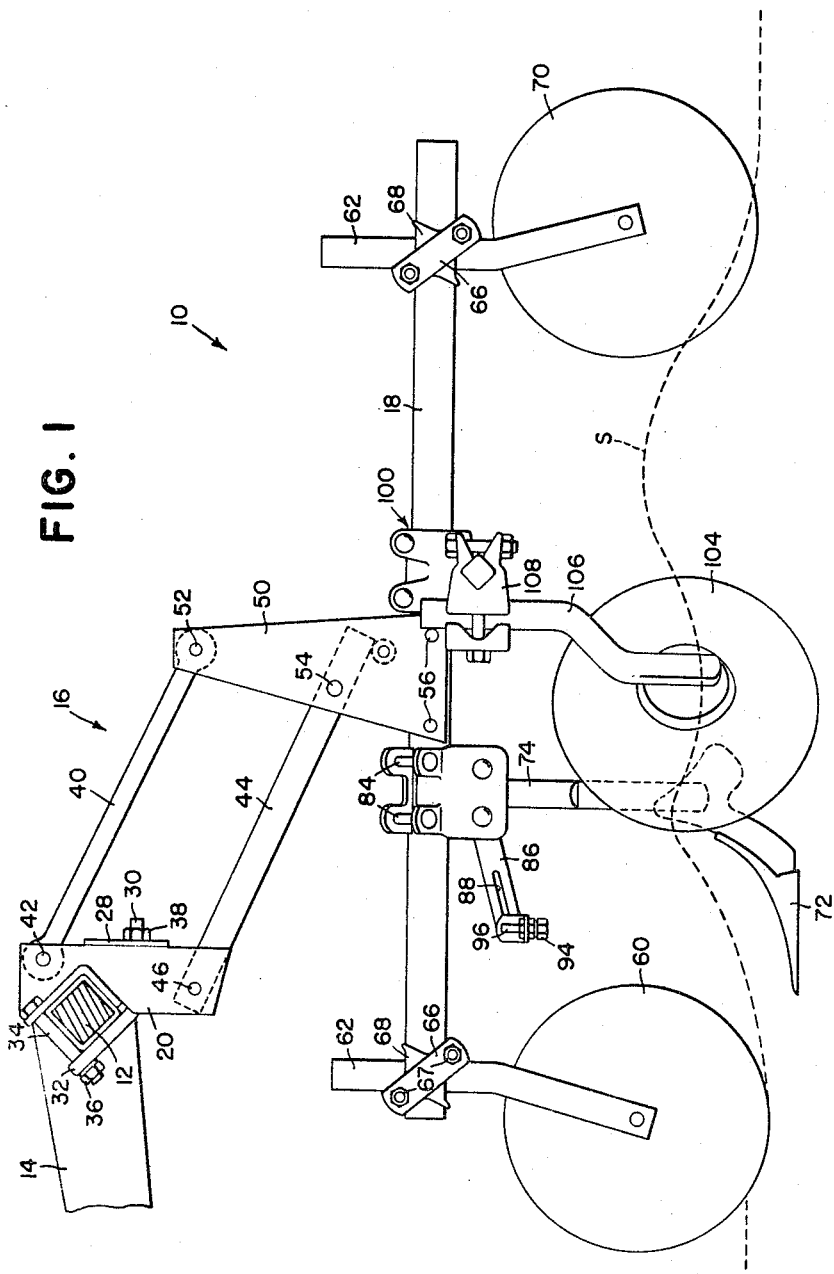
FIG. 1 is a side view of the incorporator of this invention.

In the following description right-hand and left-hand reference is determined by standing to the rear of the propelling tractor and facing the direction of travel.

The incorporator, indicated generally at 10, is adapted to be carried by a toolbar 12 which is securable to the lower draft links 14 of a tractor in any conventional fashion. A supporting structure, indicated generally at 16, is carried by the toolbar, the main beam 18 of the incorporator being carried by the lower end of the supporting structure.

The supporting structure includes a first or forward vertical member 20 which is formed of two right- and left-hand spaced apart plates 22, 24 which are welded to a V-shaped member 26 which is adapted to conform to two sides of the toolbar 12. A back plate 28 is welded across the backs of the right and left plates 22, 24. An angled eyebolt 30 is passed through an aperture in the back plate 28 with the eye portion 32 being disposed opposite the apical portion of the V-shaped member 26. A bolt 34 is disposed through an aperture in the upper end of the V-shaped member 26 with the head of the bolt adjacent the aperture, and a nut 36 securing the bolt 34 to bolt 30 adjacent the forward sides of the toolbar 12, the nut 38 holding the rear end of the eyebolt 30 firmly in place. An upper link 40 is pivotally secured between the spaced apart plates 22, 24 by means of a pin 42, and a lower link 44 is also pivotally secured to the plates 22, 24 by means of a pin 46. The rear ends of the upper and lower links 40, 44, respectively, are pivotally interconnected to a second or rearward vertical member formed from spaced apart right- and left-hand plate members 48, 50 by means of upper and lower pivot pins 52, 54. The main beam 18 of the incorporator is fixedly secured to the lower end of the right and left plates 48, 50 by means of fasteners 56.

As can be seen from FIG. 1, the linkage 20, 40, 44, 50 forms substantially a parallel linkage. However a closer inspection will show that actually the distance between the upper pivot pin 42 and the lower pivot pin 46 is slightly in excess of the distance between the pivot pins 52 and 54, and also the distance between pivot pins 42 and 52 is slightly in excess of the distance between the pins 46 and 54. Analysis of the linkage will show that in fact the two shorter links compensate for each other and that a parallel movement is obtained in the bar 18 through its normal range of movement, at least so far as commercial tolerances permit.

Mounted on the forward end of the beam 18 is a ground-engaging gauge wheel 60 rotatably secured on a standard 62 which is interconnected with the cylindrical beam 18 by means of a U-bolt 64, mounting plate 66, nuts 67, and adapter structure 68, as is conventional. A rear gauge wheel 70 is carried by a rear standard 62 which is identical with the forward standard, the rear standard 62 being secured to the rear end of the main beam 18 in the same manner as is the forward standard 62.

Figure 2:
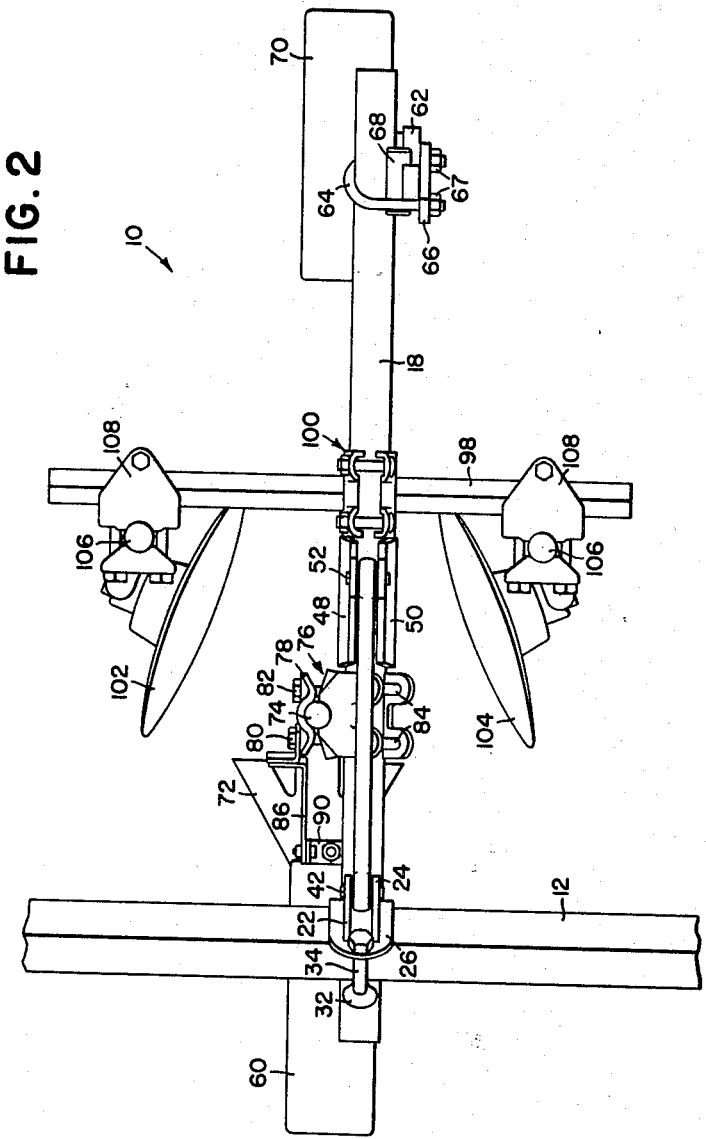
FIG. 2 is a plan view of the incorporator of this invention.

A cultivator shovel 72 is rigidly secured to a cultivator shovel standard 74 which is in turn secured to a clamping structure, indicated generally at 76, by a clamp plate 78 and by front and rear bolts 80, 82, the structure 76 being in turn secured to the beam 18 by means of bolts 84. A forwardly extending mounting bracket 86 which is provided with a longitudinally extending aperture 88 is secured to the clamp plate 78 by bolt 80 as can best be seen in FIG. 2. An L-shaped member 90 is suitably apertured on one side and receives a fastener 92 which is passed through the slot 88 and adjustably secures the L-shaped member to the bracket 86. A spray nozzle 94 is mounted on the other leg of the L-shaped member and is adapted to receive pesticide material through fluid interconnecting means 96 with a source on the tractor, the pesticide material preferably being a herbicide.

A transversely extending toolbar 98 is rigidly secured to the beam 18 by conventional clamping structure 100. Mounted at either end of the toolbar 98 are right and left disk hillers 102, 104 which are carried by standards 106 which are in turn secured at their upper ends to a clamp structure 108 carried on the toolbar 98.

In operation the incorporator 10 is propelled forwardly over the ground by the tractor and the forward gauge wheel 60 will normally gauge the depth of the beam 18. The spray nozzle will dispense herbicide material or other pesticides onto the ground surface forwardly of the shovel 72 and within the path of the disk hillers 102, 104, the soil being initially lifted up and thrown outwardly by the shovel 72. The soil will then be turned over and thrown back by the hillers 102, 104 and it will finally be smoothed and flattened by the gauge wheel 70.

Should a ditch or other depression be encountered the rear gauge wheel 70 will then gauge the depth of the beam when the front wheel 60 drops into the ditch, thereby preventing the shovel 72 and hillers 102, 104 from working the ground too deeply. The normal profile of the soil as it is being worked is shown by the broken line S in FIG. 1.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An incorporator for incorporating herbicide material deposited onto the ground up to a depth of four inches, said incorporator comprising: a transversely extending toolbar adapted to be secured to tractor means, first generally vertically disposed support means carried by said toolbar, upper and lower rearwardly extending links pivotally secured at their forward ends to the first support means, second generally vertically disposed support means pivotally secured to the rear ends of the upper and lower links, generally fore-and-aft extending beam, the intermediate portion of which is rigidly secured to the second support means, a first gauge wheel supported by the forward end of said beam, a cultivator shovel secured to said beam to the rear of said first gauge wheel, said herbicide material being deposited on the ground between the first gauge wheel and the cultivator shovel, right and left disk hillers secured to said beam to the rear of the cultivator shovel, and a second gauge wheel secured to the rear end of said beam.

2. An incorporator for incorporating herbicide material deposited onto the ground up to a depth of four inches, said incorporator comprising: a beam, mounting means interconnected with said beam and adapted to be secured to tractor means to maintain said beam substantially parallel to ground surface and to the fore-and-aft center line of the tractor means while permitting independent vertical movement, a front gauge wheel mounted on the forward end of seaid beam to normally maintain said beam at a fixed distance above ground surface, a cultivator shovel secured to said beam to the rear of said front gauge wheel, right and left disk hillers secured to said beam to the sides and rear of said cultivator shovel, said herbicide material being deposited on the ground between the front gauge wheel and the cultivator shovel, the cultivator shovel loosening and throwing outward the soil upon which the herbicide material has been deposited, and the disk hillers turning over and throwing back the loosened soil to thoroughly intermix the herbicide material with the soil up to a depth of four inches, and a second gauge wheel secured to the rear end of said beam to crush clods and generally spread out the intermixed soil, and also to maintain the proper working depth should the front gauge wheel pass over a depression in the field.

References Cited

UNITED STATES PATENTS

| | | | |
|---|---|---|---|
| 520,477 | 5/1894 | Bemis et al. | 111—7 |
| 2,004,416 | 6/1935 | Orelind | 172—307 |
| 2,691,353 | 10/1954 | Secondo | 111—52 |
| 2,734,439 | 2/1956 | Padrick | 111—52 X |
| 2,754,622 | 7/1956 | Rohnert | 111—6 X |

ABRAHAM G. STONE, *Primary Examiner.*

ROBERT E. BAGWILL, *Examiner.*